No. 622,120. Patented Mar. 28, 1899.
J. COOMBER.
VEHICLE TIRE.
(Application filed Jan. 27, 1899.)

(No Model.)

Witnesses:
Alberta Adamick
Geo. P. Fisher Jr.

Inventor:
James Coomber
By Fred Gerlack
his Attorney.

UNITED STATES PATENT OFFICE.

JAMES COOMBER, OF CHICAGO, ILLINOIS, ASSIGNOR, BY DIRECT AND MESNE ASSIGNMENTS, OF TWO-THIRDS TO JAMES WILSON, OF SAME PLACE, AND FREDERICK LEE NORTON, OF RACINE, WISCONSIN.

VEHICLE-TIRE.

SPECIFICATION forming part of Letters Patent No. 622,120, dated March 28, 1899.

Application filed January 27, 1899. Serial No. 703,574. (No model.)

*To all whom it may concern:*

Be it known that I, JAMES COOMBER, a resident of Chicago, in the county of Cook, State of Illinois, have invented certain new and useful Improvements in Vehicle-Tires, of which I do declare the following to be a full, clear, and exact description.

It has heretofore been common practice to construct a vehicle-tire of a rubber or elastic body or strip fitted within a channeled or flanged rim. It has also been customary to compress a rubber strip somewhat greater in length than the periphery of the rim to attain the desired compactness and to provide a retaining-band extending longitudinally through the rubber body for securing the rubber body in such compressed state within the rim. In such vehicle-tire the bending of the band and compression of the rubber against the rim when in use and the creeping or rolling of the rubber when subjected to lateral strains soon caused the band to wear the rubber by abrasion and more particularly that portion of the rubber between the retaining-band and the rim. The result of such wear was to cause the rubber body to become loose on the rim, and the tire would then soon become worn too much for further use. Obviously such vehicle-tires did not possess the desired durability.

An object of the present invention is to provide a vehicle-tire which is simple and inexpensive of construction and in which all danger of the wearing of the rubber by the retaining-band is avoided; and a further object of the invention is to provide an improved construction of vehicle-tire in which the rubber body or strip is securely held in the rim.

The invention consists, primarily, in providing an elastic or rubber body or strip with a series of cross-stays which are independent of the retaining-band and which permit the rubber strip to be uniformly compressed around the rim and along the retaining-band.

The invention further consists in the novel features of construction hereinafter described, illustrated in the accompanying drawings, and more particularly defined by claims at the conclusion hereof.

Figure 1:
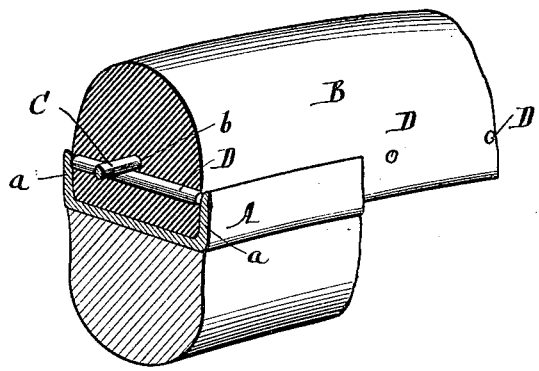
Figure 2:
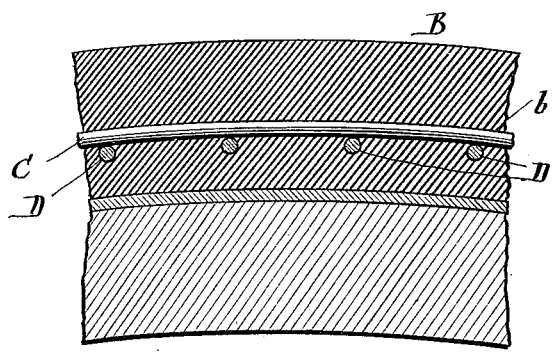
Figure 3:
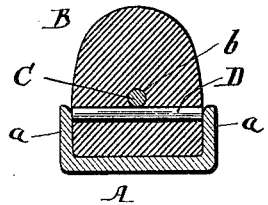

In the drawings, Figure 1 is a perspective view of a portion of a vehicle-tire embodying one form of my invention. Fig. 2 is a central longitudinal section thereof, and Fig. 3 is a transverse section thereof.

A designates a rim having flanges $a$ bent outwardly to form a channel, wherein a rubber or elastic strip or body B is seated. A longitudinal bore or aperture $b$ is formed in the elastic strip B, wherethrough a retaining-band C is extended. In the rubber strip between the retaining-band C and rim A and adjacent the retaining-band a series of cross-stays D are placed at suitable intervals. Cross-stays D are independent of the retaining-band and may be embedded in the rubber or placed in transverse holes formed therein. Cross-stays D are placed within the rubber strip before the rubber is compressed along the retaining-band and before the rubber strip is placed within the rim, and these stays are independent of the retaining-band to permit the rubber strip to be compressed along the retaining-band before the elastic strip is applied to the rim. These cross-stays are also independent of each other, so as to permit the compression of the rubber by the retaining-band to be uniform throughout. The cross-stays are also extended substantially between the rim-flanges $a$.

In practice a strip of rubber or other elastic material is cut of somewhat greater length than the periphery of the rim. Such strip is provided with the cross-stays and a longitudinal bore, through which the retaining-band is drawn or extended. The strip is then compressed and bent to fit the rim, and the ends of the retaining-band are then secured together to secure the rubber strip in the rim in such compressed state.

It will be manifest from the foregoing description that the cross-stays are independent of the retaining-band and thus permit the compression of the rubber along the retaining-band, and when the rubber is compressed in the rim the pressure of the retaining-band is distributed by the cross-stays throughout the width of the rubber strip, and the retaining-band thus firmly retains the rubber strip through its entire width seated in the rim.

Such distribution of pressure rigidly secures the rubber to the rim and prevents the rubber from becoming worn around the bore, and particularly where it contacts with the retaining-band. It will also be seen that the cross-stays will not interfere with the vertical yielding or compression of the rubber when obstructions are encountered. Furthermore, by extending the cross-stays substantially between the rim-flanges the cross-stays are confined against end or lateral play between the rim-flanges, and thus serve to further secure the rubber strip against lateral creeping or rolling when lateral strains are applied. The retaining-band secures the cross-stays against outward movement. Thus it will be seen that the rubber or elastic strip is securely held against vertical and lateral movement in the rim. A further advantage is that in many instances where heretofore a plurality of bands was necessary a single band will suffice.

The advantages of the invention are manifold. The invention is not to be understood as being restricted to the details shown and described, since these may be varied by the skilled mechanic without departing from the spirit of the invention.

Having thus described my invention, what I claim as new, and desire to secure by Letters Patent, is—

1. In a vehicle-tire the combination with a rim having side flanges, of an elastic strip seated within said rim and between said flanges, and having a longitudinal bore therein, a retaining-band extending through said bore, and a series of independent cross-stays in the elastic strip and independent of the retaining-band.

2. In a vehicle-tire, the combination with a rim having side flanges, of an elastic strip seated within the rim and between the side flanges and having a central longitudinal bore therein, of a retaining-band extending through said bore, and a series of independent cross-stays, and independent of the retaining-band, and extending substantially between the rim-flanges.

3. In a vehicle-tire, the combination with a rim having side flanges, of an elastic strip seated within said rim and between said flanges, and having a longitudinal bore therein, a retaining-band extending through said bore, and a series of cross-stays in the elastic strip independent of each other and independent of the retaining-band, and extending substantially between said rim-flanges.

4. In a vehicle-tire, the combination with a rim having side flanges, of an elastic strip seated within said rim and between said flanges, and having a longitudinal bore therein, a retaining-band extending through said bore, and a series of cross-stays independent of the band and independent of each other and transversely disposed intermediate the rim and band and having their terminals projected beyond the band and in close proximity to the rim-flanges.

5. In a vehicle-tire, the combination with a rim having side flanges, of an elastic strip seated within said rim and between said flanges, and having a longitudinal bore therein, a retaining-band extending through said bore, and a series of cross-stays independent of the band and independent of each other and extending through the elastic strip.

JAMES COOMBER.

Witnesses:
 JAMES WILSON,
 FRED GERLACH.